Figure 1:
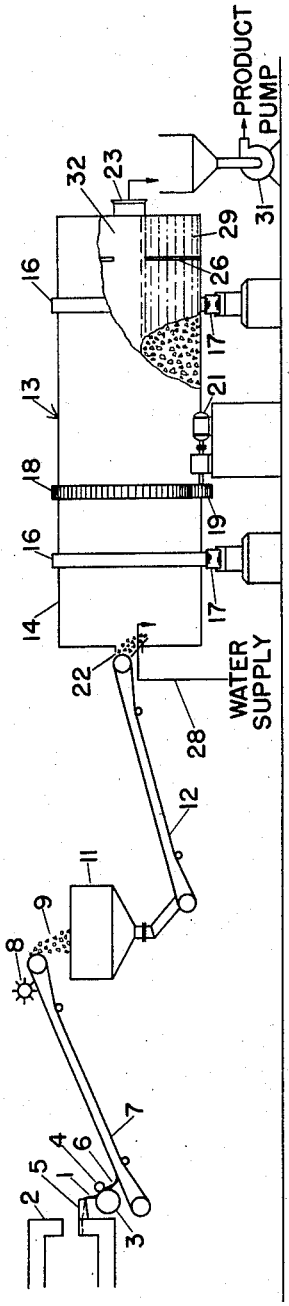

Feb. 26, 1957 L. L. BARAL 2,783,129
PROCESS FOR THE PRODUCTION OF CLEAR AQUEOUS
SOLUTION OF ALKALI METAL SILICATE
Filed March 18, 1954

INVENTOR.
LEON L. BARAL
BY

United States Patent Office 2,783,129
Patented Feb. 26, 1957

2,783,129

PROCESS FOR THE PRODUCTION OF CLEAR AQUEOUS SOLUTION OF ALKALI METAL SILICATE

Leon L. Baral, Baltimore, Md., assignor to W. R. Grace & Co., New York, N. Y., a corporation of Connecticut Application March 18, 1954, Serial No. 417,140

3 Claims. (Cl. 23—110)

This invention relates to alkali metal silicate solutions and to an improved method and apparatus for manufacturing said solutions.

In the commercial manufacture of alkali metal silicates, a mixture of sand and an alkali metal base is heated to fusion temperatures of about 2600° F. The fused melt is drawn from the furnace and upon cooling forms a solid silicate glass. To produce a silicate solution, the glass is dissolved in water by various methods.

In the past, considerable difficulty has been experienced in effecting the dissolution. It is the general belief that the glass cannot be satisfactorily dissolved on a commercial scale in hot or cold water without the use of pressure. Because the silicate dissolves slowly, pressure is used to accelerate dissolution.

In one method, the silicate is broken into lumps and charged with water into a pressure vessel heated with superheated steam. When the silicate has dissolved, it is necessary to use pressure to blow the solution to settling or storage tanks. This results in turbid solutions due to the presence of hydrated silica.

In another method, a quantity of water in contact with silicate is heated with steam under pressure while maintaining the liquid in a quiescent condition. When lumps of silicate are used, and this is generally the case, the lumps tend to agglomerate into sticky masses. Usually a gelatinous coating forms on the lumps which prevents water from reaching its interior and the lumps dissolve very slowly, if at all. Furthermore, it is generally the practice to carry out these methods on a batch basis. While continuous processes are known, their application on a commercial scale have not been successful.

It is, therefore, an object of this invention to provide an improved method and an apparatus for producing clear silicate solutions. It is another object of this invention to provide a method for producing clear aqueous solutions at atmospheric pressure. It is a further object to provide a method and apparatus for continuously dissolving silicate glass. Other objects of this invention will appear more fully hereinafter.

According to the present invention, molten silicate is disposed onto a dry chilled surface and is spread to a thin ribbon which is laid while it is still pliable onto a conveyor which advances it to a breaker roll where it is shattered and fed continuously with water into a rotating dissolving zone maintained at atmospheric pressure. As the silicate dissolves, the solution is continuously removed from the dissolving zone.

While the present invention is applicable to the preparation of alkali metal silicate solutions broadly, for illustrative purposes the invention will be described with reference to the preparation of sodium silicate solutions.

Figure 3:
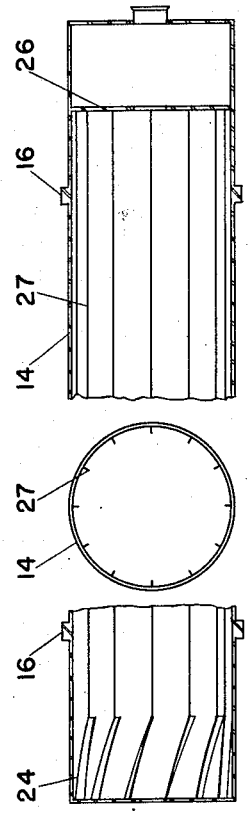
Figure 2:
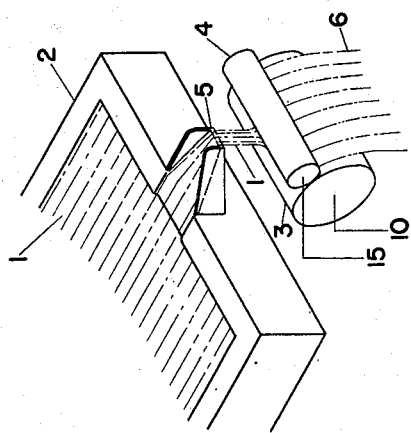

In the drawing, Fig. 1 is a flow diagram of the present invention. Fig. 2 is a perspective view of the outlet of a silicate furnace showing the molten silicate being discharged onto the associated chilled surface. Fig. 3 is a cross-section of the dissolving zone showing the dissolver in both longitudinal and transverse section.

Referring now to Fig. 1, a continuous stream of molten sodium silicate 1 at a temperature of about 2600° F. is discharged from the silicate furnace 2 by means of a trough lip 5 onto an internally cooled rotating chill roller 3.

A cooperating squeeze roll 4 is operatively associated with and biased against the chilled roller 3 and spreads the silicate into a thin ribbon 6 of uniform thickness so that it can be rapidly cooled. For present purposes, a ribbon of about $1/16$ of an inch in thickness works quite satisfactorily. In addition, the squeeze roll 4 prevents the passage of lumps of silicate glass which may have been discharged with the melt from the furnace.

The rolls 3 and 4 are maintained at a cooling temperature by passing cold water therethrough by means 10 and 15 and as the silicate is disposed thereon there occurs a decrease in temperature of the silicate substantially sufficient to immobilize the silicate. The ribbon 6 is then discharged in a pliant form onto a conveyor 7 which advances it to a breaker 8. During this advance, the silicate is cooled sufficiently to form a rigid strip having a warm interior and a cool outer surface. The breaker 8 rides over the ribbon 6 before it leaves the conveyor 7 and shatters the glass into thin fragments 9. Generally, the fragments have an area of about 1 to 3 square inches but a small amount of larger or finer sized particles will not seriously affect the operation. The ribbon 6 when it reaches breaker 8 is sufficiently cooled that upon impact the silicate will shatter. It is not completely cooled but cooling must be to a degree favorable to shattering rather than plastic deformation.

The breaker 8 is of any operable design, one which I have found to be satisfactory comprises a rotating member having a series of radial reel-type members having striker bars at the circumference and disposed parallel with the axis thereof. These bars are brought into contact with the solid sheet of silicate and shatter it to discrete particles. In order to keep a smooth load on the conveyor and breaker, the conveyor is synchronized with the surface speed of the chilled roller.

The silicate fragments 9 are deposited into a hopper 11 from which they are discharged onto a second conveyor 12 for delivery to a dissolver shown generally as 13. If desired, the fragments 9 may be delivered by the conveyor 7 directly into the dissolver 13. The use of a hopper 11 is convenient as a common feed point to the dissolver 13 when more than one source of silicate is employed, as for instance, where two or more furnaces are used. In that event, each furnace is supplied with rolls 3 and 4 and the silicate formed by the rolls is conveyed to separate breakers for shattering. The fragments are then deposited into the common hopper 11 for subsequent feed to the dissolver 13.

The dissolver 13 consists essentially of a horizontally disposed elongated drum or cylinder 14 provided with circumferential riding rings 16 carried on idlers 17. Cylinder 14 is rotated at a speed of about 1.5 to about 3.0 R. P. M. by means of a ring gear 18 and pinion gear 19 driven by a motor 21. The cylinder 14 is provided with an axial inlet 22 and an axial outlet 23, the outlet 23 being of greater diameter than the inlet 22. Feed flights 24, shown in Fig. 3, are distributed around the inner circumference near the inlet of the cylinder 14 and are secured to the wall thereof. The flights 24 are pitched about 20 degrees from the axis and advance the silicate into the cylinder 14. A retaining ring 26 is secured to the inner surface near the outlet of the cylinder 14 to retain the particles therein. Lifting flights 27, as shown in Fig. 3 and the inset thereto, are provided for gently agitating the mixture of silicate and water and are spaced intermediate the feed flights 24 and the retaining ring 26 and secured to the inner wall of the cylinder 14. A quiescent zone 32 is located intermediate the retaining ring 26 and the outlet of the dissolver for settling of particles escaping over the retaining ring 26 with the agitated liquid 29. If desired, the retaining ring can be eliminated and the particles carried by the effluent solution can be separated by convenient means.

In operation, the shattered ribbon glass 9 is continuously fed at a predetermined rate to the inlet 22 of the dissolver 13 where the fragments are advanced therein by feed flights 24. Water is continuously passed at a controlled rate by means 28 to the inlet 22 of dissolver 13 to contact the silicate particles therein. The temperature of the water is varied and is dependent upon the heat provided by the hot silicate. The combined heat from the water and silicate must be sufficient to maintain the dissolving system near the boiling point.

The agitating effect of the lifting flights 27 and the rotation of the cylinder 14 causes the bed of silicate and water to tumble upon itself while progressing continuously through the dissolver 13. Here, the size of the glass is further reduced by the gentle tumbling action. Because the shattered ribbon glass has greater surface than lump glass, it dissolves more rapidly and the use of pressure is avoided. As the glass in contact with the solution dissolves, the constant agitation tends to build up the silicate concentration in the liquid product. The solution 29 is retained in the zone at a constant level determined by the size of the outlet opening. The clear effluent from zone 13 of the desired gravity, usually about 40° Bé., passes to pump 31 which moves it to product storage, not shown. Since the agitation provided by the rotation of the cylinder 14 accelerates dissolution of the silicate, the cylinder may be rotated at a speed greater that 3.0 R. P. M. However, the speed of rotation should not be such as would cause undissolved particles of silicate to be discharged with the effluent solution by over-agitating the mass.

The outer surface of cylinder 14 is insulated with a suitable material, such as asbestos, to maintain a uniform temperature in the zone 13. The temperature of the solution is maintained near its boiling point but boiling of the solution is to be avoided. If boiling occurs when the solution is near its maximum concentration, the loss of water may cause formation of a scum of hydrated silicate which is difficult to re-dissolve. While some boiling may occur near the inlet of the dissolver as the hot silicate and water are initially contacted, there are no adverse effects from boiling at the inlet, due to the low concentration of the silicate at that point. As the mass advances into the dissolver there is some loss of heat and consequently boiling stops.

The concentration of the solution is regulated by controlling the rate of the water passed into the dissolver 13. In commercial processes, a silicate solution having a gravity of 40° Bé., when measured at 60° F. is usually the desired product. In the present invention, the density of the solution is maintained at the desired level by increasing or decreasing the rate of water passed into the zone without interrupting the process. Further density control may be obtained by passing the bulk of the water into the dissolver at the inlet and passing a small stream to the outlet to dilute the solution to the desired concentration. The addition of a small amount of water at the discharge end of zone 13 may help to clarify the solution further.

The present invention is further illustrated by the following example:

Molten silicate having a ratio of 3.3:1 $SiO_2:Na_2O$ was discharged at a temperature of about 2600° F. in a stream from the furnace onto a chilled roller. The silicate was spread into a ribbon $\frac{1}{16}$ inch thick by a cooperating squeeze roll and discharged from the rolls at a temperature of about 1000° F. onto a conveyor, which advanced the ribbon to a breaker. During this advance, the silicate cooled to a temperature of about 600° F. at which temperature it was rigid. The breaker shattered the ribbon into fragments, which were delivered continuously into a horizontal rotating dissolver operated at atmospheric pressure, at a rate of about 8300 pounds per hour. Water preheated to a temperature of about 165° F. was continuously passed at a controlled rate of about 28 G. P. M. in contact with the silicate in the dissolver. The combined heat from the silicate and the water was sufficient to maintain the mass of liquid at a temperature of approximately 210° F. The dissolver was rotated at a speed of about 1.5 R. P. M. which caused a gentle agitating effect on the mass, and as the silicate dissolved the concentration of the silicate in the product increased. Samples of the solution were periodically taken to determine the strength of the solution which was corrected to 40° Bé. by increasing or decreasing the amount of water passed into the dissolver. The concentrated solution was continuously discharged at a rate of about 37 G. P. M. The product which was a water clear solution of uniform concentration was pumped to storage for subsequent use.

By the present invention, 40° Bé. silicate solution can be produced in approximately ⅔ the time required to dissolve the lump glass of commerce. This is accomplished by employing thin fragments of hot glass which have a greater surface than the lump glass generally used in dissolving operations, and utilizing the latent heat of the solid glass to maintain the solution in the dissolver at the maximum permissible temperature, which are important factors in the present invention. It is the practice of the prior art to employ steam and/or pressure to effect dissolution. Neither of these are contemplated in the present invention. The dissolving medium is maintained at a uniform dissolving temperature throughout the process without the addition of any appreciable amount of external heat.

I claim:

1. A method of continuously forming a clear aqueous solution of sodium silicate which comprises continuously introducing thin rigid fragments of warm sodium silicate into a slowly rotating elongated horizontal dissolving zone maintained at atmospheric pressure, continuously passing preheated water at a controlled rate into said zone in contact with said silicate whereby the combined heat from said silicate and water is sufficient to maintain the temperature of the resulting solution uniformly near but below its boiling point, and continuously withdrawing the solution from said zone.

2. A method of continuously dissolving alkali metal silicate to form a clear aqueous solution thereof comprising continuously feeding thin rigid silicate fragments which are relatively warm interiorly and relatively cool exteriorly into the inlet end of a rotating elongated horizontal dissolving zone maintained at atmospheric pressure, continuously introducing preheated water at a controlled rate into said zone in contact with said silicate whereby the combined heat from said silicate and water is sufficient to maintain the dissolving system uniformly near but below its boiling point, continuously moving the mass of silicate and water through said zone to progressively dissolve said silicate, and continuously withdrawing the resulting solution from the discharge end thereof.

3. A method of continuously dissolving sodium silicate to form a clear aqueous solution thereof comprising continuously charging rigid silicate fragments having a temperature of about 600° F. into the inlet end of a horizontal rotating dissolver operating at atmospheric pressure, passing at a controlled rate water preheated to a temperature of about 165° F. at a controlled rate in contact with the silicate in said dissolver whereby the combined heat from the silicate and the water is sufficient to maintain the dissolving system at a temperature of about 210° F., moving the mass of silicate and water through said dissolver to progressively dissolve said silicate, and continuously discharging the resulting solution from the opposite end of said dissolver.

References Cited in the file of this patent

UNITED STATES PATENTS

| 1,447,637 | Baker | Mar. 6, 1923 |
| 1,944,848 | Scheidt | Jan. 23, 1934 |
| 2,026,451 | Alberthauser | Dec. 31, 1935 |
| 2,086,230 | Lemmerman | July 6, 1937 |
| 2,131,718 | McDaniel | Sept. 27, 1938 |
| 2,199,928 | Van Wirt | May 7, 1940 |

OTHER REFERENCES

Vail: "Soluble Silicates," volume 1, 26, 78 (1952), Reinhold Publishing Corp., New York.